(12) United States Patent
Rathnavelu et al.

(10) Patent No.: US 10,599,453 B1
(45) Date of Patent: Mar. 24, 2020

(54) DYNAMIC CONTENT GENERATION WITH ON-DEMAND CODE EXECUTION

(71) Applicant: Amazon Technologies, Inc., Seattle, WA (US)

(72) Inventors: Kadirvelu Rathnavelu, Seattle, WA (US); Simon Poile, Newcastle, WA (US); Nicolas Webb, Bothell, WA (US); Georgie Mathews, Seattle, WA (US); Victor Galis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 34 days.

(21) Appl. No.: 15/715,043

(22) Filed: Sep. 25, 2017

(51) Int. Cl.
G06F 9/455 (2018.01)
G06Q 30/02 (2012.01)

(52) U.S. Cl.
CPC ......... *G06F 9/455* (2013.01); *G06Q 30/0276* (2013.01)

(58) Field of Classification Search
CPC .............................. G06F 9/455; G06F 11/1458
USPC .............................................. 718/1, 100–105
See application file for complete search history.

(56) References Cited

U.S. PATENT DOCUMENTS

| | | | | |
|---|---|---|---|---|
| 8,108,844 B2* | 1/2012 | Crutchfield | ............. | G06F 8/443 717/136 |
| 8,276,139 B2* | 9/2012 | Bozek | .................. | G06F 9/5044 370/395.2 |
| 8,341,270 B2* | 12/2012 | Mazzaferri | .......... | G06F 3/1415 709/227 |
| 8,381,224 B2* | 2/2013 | Huetter | ................. | G06F 9/5066 707/607 |
| 8,713,676 B2* | 4/2014 | Pandrangi | .......... | H04L 63/1416 726/22 |
| 8,813,073 B2* | 8/2014 | Kwon | ................... | G06F 9/5088 718/1 |
| 8,869,164 B2* | 10/2014 | Bobroff | ................... | G06F 9/505 718/1 |
| 8,904,384 B2* | 12/2014 | Low | ...................... | G06F 9/5088 717/148 |
| 8,914,796 B2* | 12/2014 | Burckart | .................. | G06F 8/65 717/174 |
| 8,973,009 B2* | 3/2015 | Louise | ................. | G06F 9/3851 718/104 |
| 8,984,506 B2* | 3/2015 | Fletcher | ............. | G06F 9/45558 709/223 |
| 9,003,503 B2* | 4/2015 | Rodriguez | ........... | G06F 9/5072 713/1 |

(Continued)

OTHER PUBLICATIONS

Mita et al, "Early Warning of Task Failure using Task Processing Logs", ACM, pp. 1-7, 2017 (Year: 2017).*

(Continued)

*Primary Examiner* — Anil Khatri
(74) *Attorney, Agent, or Firm* — Knobbe, Martens, Olson & Bear, LLP

(57) ABSTRACT

Systems and methods are described for conducting data processing against a target data set in an on-demand code execution system. The on-demand code execution system can enable execution of user-provided executable code. The user-provided executable code is embedded in communications sent to a user. Each execution of the data processing code can process at least a portion of a data to determine content to be rendered in the communications. The resulting content is rendered and provided to the user.

20 Claims, 8 Drawing Sheets

(56) References Cited

U.S. PATENT DOCUMENTS

| | | | | |
|---|---|---|---|---|
| 9,009,707 B2* | 4/2015 | Chandrakar | ........ | G06F 9/45533 716/116 |
| 9,027,022 B2* | 5/2015 | Huetter | ................ | G06F 9/5066 718/1 |
| 9,116,713 B1* | 8/2015 | Rao | ..................... | G06F 9/44542 |
| 9,952,896 B2* | 4/2018 | Wagner | ................... | G06F 9/485 |
| 10,203,990 B2* | 2/2019 | Wagner | ................ | G06F 9/5077 |
| 10,445,140 B1* | 10/2019 | Sagar | .................... | G06F 9/4887 |

OTHER PUBLICATIONS

Ploitsyna et al, "Task Dispatching System for the Complex of Natural Language Processing Tools", ACM, pp. 1-8, 2017 (Year: 2017).*

Cao et al, "Agent-Based Grid Load Balancing Using Performance-Driven Task Scheduling", IEEE, pp. 1-10 (Year: 2003).*

Klug et al, "Executable Task Models", ACM, pp. 119-122 (Year: 2005).*

Vandierendonck et al, "Analysis of Dependence Tracking Algorithms for Task Dataflow Execution", ACM, pp. 1-24 (Year: 2013).*

Barboni et al, "Beyond Modelling: An Integrated Environment Supporting Co-Execution of Tasks and Systems Models", ACM, pp. 165-174 (Year: 2010).*

Manolache et al, "Schedulability Analysis of Applications with Stochastic Task Execution Times", ACM, pp. 706-735 (Year: 2004).*

* cited by examiner

DYNAMIC CONTENT GENERATION WITH ON-DEMAND CODE EXECUTION

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1A:
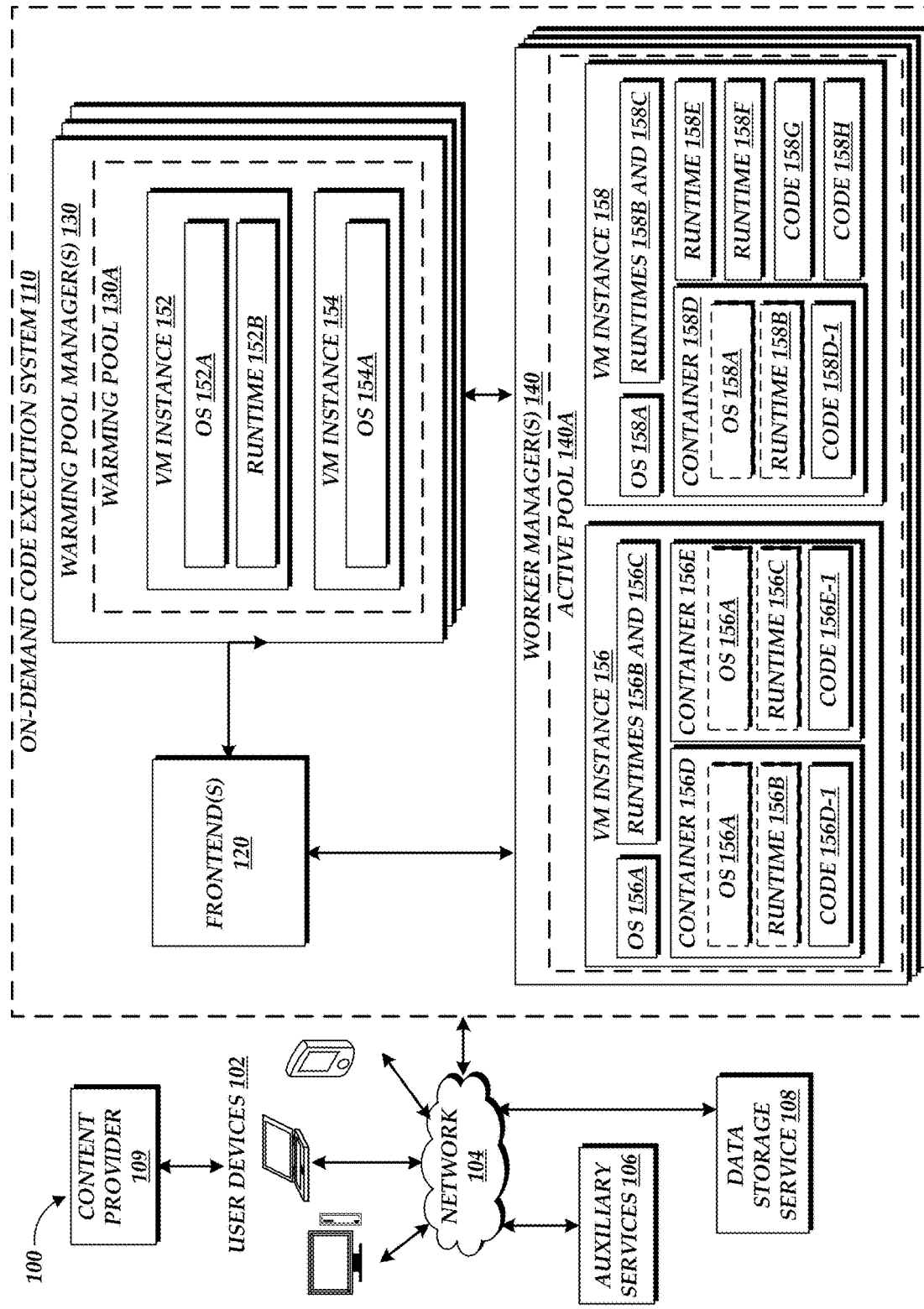
FIG. 1A is a block diagram depicting an illustrative environment in which an on-demand code execution system can operate to execute tasks corresponding to code, which may be submitted by users of the on-demand code execution system, and to enable execution of such code.

Generally described, aspects of the present disclosure relate to an on-demand code execution system. The on-demand code execution system enables rapid execution of code, which may be supplied by users of the on-demand code execution system. More specifically, aspects of the present disclosure enable the on-demand code execution system to receive on-demand code embedded in communications. Such on-demand code execution may be beneficial, for example, in instances where the on-demand code execution system facilitates the dynamic determination of content to be rendered in communications sent to individual users. Illustratively, communications can include any form of data transmission that may be transmitted to individual users, or groups of users, and rendered in a manner to present users content. Examples include, but are not limited to, email communications, text messaging, multi-media messaging, chats, and the like.

Typically, communications are generated in a manner such that content is fixed at the time of generation of the communication. For example, a communication may be generated advertising access to product or service that has limitations, such as expiration of time or an available quantity. If a recipient accesses the communication after the expiration or subsequent to redeeming the advertised service or product, the content of the communication is no longer valid. In some communications, a link or other resource identifier may be presented in a communication that causes a client computing device to receive the resource, such as an image, when accessed. In this embodiment, however, the resource is also fixed or selected at the time of embedding of the link or requires the content provide to independently modify the resource as part of a management process. The present disclosure addresses this problem by enabling the embedding on on-demand executable code to facilitate dynamic generation of content in communications. Specifically, in accordance with embodiments of the present disclosure, the on-demand code execution system can be configured to receive on-demand code embedded in communications, and to initiate execution of on-demand code to determine the content that will be rendered in the communication. In this manner, the content that is generated for individual communications can be dynamically determined at the time the content is accessed.

In still further embodiments, the content generated in individual communications may be dynamically generated each time the content is accessed. In this embodiment, a first access to a communication may generate a first set of content based on execution of the on-demand code execution at a first time. Subsequent access of the same on-demand code may generate a second set of content based on execution of the on-demand code execution at a second time. For example, the first set of content can correspond to content related to an initial offer to purchase or access a product or service. The second set of content can correspond to content related to post-purchase activity (e.g., buy it again) or activity that has transpired after the first access (e.g., to finish shopping and purchase, click here).

In other embodiments, the on-demand code execution system can capture state information associated with state of the execution of on-demand code execution or state information associated with the request for the execution of on-demand code to track the effectiveness of dynamically generated content among a customer based. Illustratively, state can include location, time of day, activities, customer identifiers, operating systems, access time, and the like. Based on processing the state information, the on-demand code execution system can utilize state information to make associations of dynamically generated content or dynamically generated content requests to improved content generation. For example, the on-demand code execution system can provide a set of recommendations regarding different types of dynamically generated content that can be included in a communication. In another example, the on-demand code execution system can generate scores or otherwise characterize a measure of potential communications based on targeted demographic information and the processed data.

In some embodiments, the processing of the on-demand code may be facilitated through the transmission and execution of executable code via a server computing device. The executable code can be in the form of structured code that can be executed by a service computing device natively or in accordance with a specific software application configured to execute code. The server computing devices can correspond to physical computing devices maintained by a service provider. Alternatively, the server computing devices can corresponds to virtualized resources that are configured to execute the transmitted on-demand code, such as scripts.

In other embodiments, the processing of the on-demand code may be facilitated through the execution of tasks in an on-demand code execution system. Accordingly, the general execution of tasks on the on-demand code execution system will now be discussed. As described in detail herein, the on-demand code execution system may provide a network-accessible service enabling users to submit or designate computer-executable code to be executed by virtual machine instances on the on-demand code execution system. Each set of code on the on-demand code execution system may define a "task," and implement specific functionality corresponding to that task when executed on a virtual machine instance of the on-demand code execution system. As will be described in greater detail below, illustratively the tasks executed by the on-demand code execution system may relate to the dynamic generation or selection of content. Individual implementations of the task on the on-demand code execution system may be referred to as an "execution" of the task (or a "task execution").

The on-demand code execution system can enable users to trigger execution of a task based on a variety of potential events, such as transmission of an application programming interface ("API") call to the on-demand code execution system, or transmission of a specially formatted hypertext transport protocol ("HTTP") packet to the on-demand code execution system. Thus, users may utilize the on-demand code execution system to execute any specified executable code "on-demand," without requiring configuration or maintenance of the underlying hardware or infrastructure on which the code is executed. Further, the on-demand code execution system may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution system can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time. As applied to the present application, the execution of the executable code in a rapid manner facilitates the dynamic generation of content when a communication is selected or otherwise initiated by a user.

To execute tasks, the on-demand code execution system described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution system may maintain a pool of virtual machine instances on one or more physical computing devices, where each virtual machine instance has one or more software components (e.g., operating systems, language runtimes, libraries, etc.) loaded thereon. When the on-demand code execution system receives a request to execute the program code of a user (a "task"), which specifies one or more computing constraints for executing the program code of the user, the on-demand code execution system may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution system may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user transmitted executable code at least partly by creating and configuring containers inside the allocated virtual machine instance. Various embodiments for implementing a virtual machine instance manager and executing user code on virtual machine instances is described in more detail in U.S. Pat. No. 9,323,556, entitled PROGRAMMATIC EVENT DETECTION AND MESSAGE GENERATION FOR REQUESTS TO EXECUTE PROGRAM CODE, and filed Sep. 30, 2014 ("the '556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulates hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

As will be appreciated by one of skill in the art in light of the present disclosure, the embodiments disclosed herein improves the ability of computing systems, such as on-demand code execution systems, to execute code in an efficient manner, enabling communications to be generated by a content provider, such as a service provider, without requiring the content to be pre-selected at the time the communication is selected. Moreover, the presently disclosed embodiments address technical problems inherent within computing systems; specifically, the management of event-sensitive communications in which communications can take on different meanings based on the occurrence or lack of occurrence of events (e.g., time, user activity, and the like). These technical problems are addressed by the various technical solutions described herein, including the utilization of embedded on-demand executable code that can be provided to dynamically select content to be rendered in a communication. Thus, the present disclosure represents an improvement on existing data processing systems and computing systems in general.

The foregoing aspects and many of the attendant advantages of this disclosure will become more readily appreciated as the same become better understood by reference to the following description, when taken in conjunction with the accompanying drawings.

FIG. 1A is a block diagram of an illustrative operating environment 100 in which an on-demand code execution system 110 may operate based on communication with user computing devices 102, auxiliary services 106, network-based data storage services 108, and content providers 109. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programming interfaces (API), or other programmatic interfaces for generating and uploading user-executable code, invoking the user-provided code (e.g., submitting a request to execute the user codes on the on-demand code execution system 110), scheduling event-based jobs or timed jobs, tracking the user-provided code, or viewing other logging or monitoring information related to their requests or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the on-demand code execution environment 110 or otherwise communicate to the on-demand code execution environment 110. For example, the auxiliary services 106 can include web services (e.g., associated with the user computing devices 102, with the on-demand code execution system 110, or with third parties), databases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. Components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The illustrative environment 100 further includes one or more network-based data storage services 108, configured to enable the on-demand code execution system 110 to store and retrieve data from one or more persistent or substantially persistent data sources. Illustratively, the network-based data storage services 108 may enable the on-demand code execution system 110 to retrieve data to be processed during execution of a task, and store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the on-demand code execution system 110 to query for and retrieve information regarding data stored within the on-demand code execution system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The illustrative environment 100 further includes one or more network-based content providers 109, configured to provide communications, either directly or indirectly, to user computing devices to enable the on-demand code execution system 110 to dynamically select content to be rendered in the communications. Illustratively, the network-based content providers 109 may enable the on-demand code execution system 110 to retrieve data to be processed during execution of a task, and store information (e.g., results) regarding that execution.

The user computing devices 102, auxiliary services 106, network-based data storage services 108 and network-based content providers 109 may communicate with the on-demand code execution system 110 and each other via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1A as operating in a distributed computing environment including several computer systems that are interconnected using one or more computer networks (not shown in FIG. 1A). The on-demand code execution system 110 could also operate within a computing environment having a fewer or greater number of devices than are illustrated in FIG. 1A. Thus, the depiction of the on-demand code execution system 110 in FIG. 1A should be taken as illustrative and not limiting to the present disclosure. For example, the on-demand code execution system 110 or various constituents thereof could implement various Web services components, hosted, or "cloud" computing environments, or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1A, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontend 120 (which may in some instances represent multiple frontends 120) may be connected to the network 104, and other components of the on-demand code execution system 110 may communicate with other components of the environment 100 via the frontends 120.

In FIG. 1A, users, by way of user computing devices 102, may interact with the on-demand code execution system 110 to provide executable code, and establish rules or logic defining when and how such code should be executed on the on-demand code execution system 110, thus establishing a "task." As applied to the present application, a user may wish to run a piece of code embedded in a communication provided to the user and accessed via a web or mobile application. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances.

The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

To enable interaction with the on-demand code execution system 110, the environment 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface 122 providing user computing devices 102 with the ability to upload or otherwise communication user-specified code to the on-demand code execution system 110 and to thereafter request execution of that code. In one embodiment, the request interface 122 communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, or Ruby (or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110.

The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a ZIP file containing the user code and any libraries (or identifications of storage locations thereof) corresponding to the task requested for execution. In some embodiments, the call includes metadata that indicates the program code of the task to be executed, the language in which the program code is written, the user associated with the call, or the computing resources (e.g., memory, etc.) to be reserved for executing the program code.

For example, the program code of a task may be provided with the call, previously uploaded by the user, provided by the on-demand code execution system 110 (e.g., standard routines), or provided by third parties, such as the content provider generating the communication. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. For example, the content provider generating the content of the communication may establish the resource-level constraints for all communications independent of any user submitted request for executing code embedded in individual messages. In some embodiments, the call may specify other constraints such as permission data that indicates what kind of permissions or authorities that the call invokes to execute the task. Such permission data may be used by the on-demand code execution system 110 to access private resources (e.g., on a private network).

To manage requests for code execution, the frontend 120 can include an execution queue (not shown in FIG. 1A), which can maintain a record of requested task executions. Illustratively, the number of simultaneous task executions by the on-demand code execution system 110 is limited, and as such, new task executions initiated at the on-demand code execution system 110 (e.g., via an API call, via a call from an executed or executing task, etc.) may be placed on the execution queue 124 and processed, e.g., in a first-in-first-out order. In some embodiments, the on-demand code execution system 110 may include multiple execution queues, such as individual execution queues for each user account. For example, users of the on-demand code execution system 110 may desire to limit the rate of task executions on the on-demand code execution system 110 (e.g., for cost reasons). Thus, the on-demand code execution system 110 may utilize an account-specific execution queue to throttle the rate of simultaneous task executions by a specific user account. In some instances, the on-demand code execution system 110 may prioritize task executions, such that task executions of specific accounts or of specified priorities bypass or are prioritized within the execution queue. In other instances, the on-demand code execution system 110 may execute tasks immediately or substantially immediately after receiving a call for that task, and thus, the execution queue may be omitted.

The frontend 120 can further includes an output interface (not shown in FIG. 1A) configured to output information regarding the execution of tasks on the on-demand code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 for the rendering of content in received communications. Additionally, the output interface may be transmit additional data to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

As shown in FIG. 1A, in some embodiments, the on-demand code execution system 110 may include multiple frontends 120. In such embodiments, a load balancer (not shown in FIG. 1A) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution system, such as the warming pools 130A or active pools 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more warming pool managers 130, which "pre-warm" (e.g., initialize) virtual machine instances to enable tasks to be executed quickly, without the delay caused by initialization of the virtual machines. The on-demand code execution system 110 further includes one or more worker managers 140, which manage active virtual machine instances (e.g., currently assigned to execute tasks in response to task calls).

The warming pool managers 130 ensure that virtual machine instances are ready to be used by the worker managers 140 when the on-demand code execution system 110 detects an event triggering execution of a task on the on-demand code execution system 110. In the example illustrated in FIG. 1A, each warming pool manager 130 manages a corresponding warming pool 130A, which is a group (sometimes referred to as a pool) of pre-initialized and pre-configured virtual machine instances that may be used to execute tasks in response to triggering of those tasks. In some embodiments, the warming pool managers 130 cause virtual machine instances to be booted up on one or more physical computing machines within the on-demand code execution system 110 and added to a corresponding warming pool 130A. For example, each warming pool manager 130 may cause additional instances to be added to the corresponding warming pool 130A based on the available capacity in the corresponding warming pool 130A to service incoming calls. As will be described below, the warming pool managers 130 may further work in conjunction with other components of the on-demand code execution system 110, such as the worker managers 140, to add or otherwise manage instances or containers in the warming pools 130A based on received pre-trigger notifications. In some embodiments, the warming pool managers 130 may use both physical computing devices within the on-demand code execution system 110 and one or more virtual machine instance services to acquire and maintain compute capacity that can be used to service calls received by the frontends 120. Further, the on-demand code execution system 110 may comprise one or more logical knobs or switches for controlling (e.g., increasing or decreasing) the available capacity in the warming pools 130A. For example, a system administrator may use such a knob or switch to increase the capacity available (e.g., the number of pre-booted instances) in the warming pools 130A during peak hours. In some embodiments, virtual machine instances in the warming pools 130A can be configured based on a predetermined set of configurations independent from a specific call to execute a task. The predetermined set of configurations can correspond to various types of virtual machine instances to execute tasks. The warming pool managers 130 can optimize types and numbers of virtual machine instances in the warming pools 130A based on one or more metrics related to current or previous task executions. Further, the warming pool managers 130 can establish or modify the types and number of virtual machine instances in the warming pools 130A based on pre-trigger notifications (e.g., by pre-initializing one or more virtual machine instances based on requirements of a task expected to be executed based on a received pre-trigger notification).

As shown in FIG. 1A, instances may have operating systems (OS) or language runtimes loaded thereon. For example, the warming pool 130A managed by a warming pool manager 130 can comprise instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1A to include a single runtime, in other embodiments, the instances depicted in FIG. 1A may include two or more runtimes, each of which may be used for running a different user code. In some embodiments, the warming pool managers 130 may maintain a list of instances in a corresponding warming pool 130A. The list of instances may further specify the configuration (e.g., OS, runtime, container, etc.) of the instances.

In some embodiments, the virtual machine instances in a warming pool 130A may be used to serve any user's calls.

In one embodiment, all the virtual machine instances in a warming pool 130A are configured in the same or substantially similar manner. In another embodiment, the virtual machine instances in a warming pool 130A may be configured differently to suit the needs of different users. For example, the virtual machine instances may have different operating systems, different language runtimes, or different libraries loaded thereon. In yet another embodiment, the virtual machine instances in a warming pool 130A may be configured in the same or substantially similar manner (e.g., with the same OS, language runtimes, or libraries), but some of those instances may have different container configurations. For example, one instance might have a container created therein for running code written in Python, and another instance might have a container created therein for running code written in Ruby.

The warming pool managers 130 may pre-configure the virtual machine instances in a warming pool 130A, such that each virtual machine instance is configured to satisfy at least one of the operating conditions that may be requested or specified by a user when defining a task. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution system 110, the user interface may prompt the user to specify one of the predetermined operating conditions for executing the task. In another example, the service-level agreement (SLA) for utilizing the services provided by the on-demand code execution system 110 may specify a set of conditions (e.g., programming languages, computing resources, etc.) that tasks should satisfy, and the on-demand code execution system 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pools 130A are usable by which user), among other specified conditions.

One or more worker managers 140 manage the instances used for servicing incoming calls to execute tasks. In the example illustrated in FIG. 1A, each worker managers 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1A, instances may have operating systems (OS), language runtimes, and containers. The containers may have individual copies of the OS, the runtimes, and user codes corresponding to various tasks loaded thereon. In the example of FIG. 1A, the active pools 140A managed by a worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1A, instances may have user codes loaded thereon, and containers within those instances may also have user codes loaded therein. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool 130A (e.g., including the number and type of instances). In other embodiments, the worker managers 140 requests compute capacity from a warming pool manager 130 without having knowledge of the virtual machine instances in a warming pool 130A.

In the example illustrated in FIG. 1A, tasks are executed in isolated execution environments referred to as containers (e.g., containers 156D, 156E, 158D). Containers are logical units created within a virtual machine instance using the resources available on that instance. For example, each worker manager 140 may, based on information specified in a call to execute a task, create a new container, or locate an existing container in one of the instances in an active pool 140A and assigns the container to the call to handle the execution of the task. In one embodiment, such containers are implemented as Linux containers.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector 126 configured to determine a worker manager 140 to which to pass the execution request. Illustratively, to assist in implementation of execution guarantees, the location selector 126 to select the same worker manager 140 to receive each call to a task to the same worker manager 140, such that the worker manager 140 can maintain an authoritative execution record for the task. In one embodiment, the location selector 126 may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

On receiving a request to execute a task, a worker manager 140 finds capacity to execute a task on the on-demand code execution system 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. For example, a user may transmit a request to re-execute the on-demand code by accessing a communication multiple times. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the user code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the user code of the task to be downloaded and executed on the container.

In some embodiments, the on-demand code execution system 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution system 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms.

In some embodiments, the on-demand code execution system 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution system 110 may maintain a separate cache in which code of tasks are stored to serve as an intermediate level of caching system between the local cache of the virtual machine instances and the account data store 164 (or other network-based storage not shown in FIG. 1A). The various scenarios that the worker manager 140 may encounter in servicing the call are described in greater detail within the '556 Patent, incorporated by reference above (e.g., at FIG. 4 of the '556 Patent).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container or the instance running after the task is done executing may be based on a threshold time, the type of the user, average task execution volume of the user, or other operating conditions. For example, after a threshold time has passed (e.g., 5 minutes, 30 minutes, 1 hour, 24 hours, 30 days, etc.) without any activity (e.g., task execution), the container or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution system 110 may provide data to one or more of the auxiliary services 106 as it executes tasks in response to triggering events. For example, the frontends 120 may communicate with the monitoring/logging/billing services included within the auxiliary services 106. The monitoring/logging/billing services may include: a monitoring service for managing monitoring information received from the on-demand code execution system 110, such as statuses of containers and instances on the on-demand code execution system 110; a logging service for managing logging information received from the on-demand code execution system 110, such as activities performed by containers and instances on the on-demand code execution system 110; and a billing service for generating billing information associated with executing user code on the on-demand code execution system 110 (e.g., based on the monitoring information or the logging information managed by the monitoring service and the logging service). In addition to the system-level activities that may be performed by the monitoring/logging/billing services (e.g., on behalf of the on-demand code execution system 110), the monitoring/logging/billing services may provide application-level services on behalf of the tasks executed on the on-demand code execution system 110. For example, the monitoring/logging/billing services may monitor or log various inputs, outputs, or other data and parameters on behalf of the tasks being executed on the on-demand code execution system 110.

In some embodiments, the worker managers 140 may perform health checks on the instances and containers managed by the worker managers 140 (e.g., those in a corresponding active pool 140A). For example, the health checks performed by a worker manager 140 may include determining whether the instances and the containers managed by the worker manager 140 have any issues of (1) misconfigured networking or startup configuration, (2) exhausted memory, (3) corrupted file system, (4) incompatible kernel, or any other problems that may impair the performance of the instances and the containers. In one embodiment, a worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, a worker manager 140 may perform similar health checks on the instances or containers in a warming pool 130A. The instances or the containers in a warming pool 130A may be managed either together with those instances and containers in an active pool 140A or separately. In some embodiments, in the case where the health of the instances or the containers in a warming pool 130A is managed separately from an active pool 140A, a warming pool manager 130, instead of a worker manager 140, may perform the health checks described above on the instances or the containers in a warming pool 130A.

In the depicted example, virtual machine instances ("instances") 152, 154 are shown in a warming pool 130A managed by a warming pool manager 130, and instances 156, 158 are shown in an active pool 140A managed by a worker manager 140. The illustration of the various components within the on-demand code execution system 110 is logical in nature and one or more of the components can be implemented by a single computing device or multiple computing devices. For example, the instances 152, 154, 156, 158 can be implemented on one or more physical computing devices in different various geographic regions. Similarly, each frontend 120, warming pool manager 130, and worker manager 140 can be implemented across multiple physical computing devices. Alternatively, one or more of a frontend 120, a warming pool manager 130, and a worker manager 140 can be implemented on a single physical computing device. Although four virtual machine instances are shown in the example of FIG. 1A, the embodiments described herein are not limited as such, and one skilled in the art will appreciate that the on-demand code execution system 110 may comprise any number of virtual machine instances implemented using any number of physical computing devices. Similarly, although multiple warming pools 130A and active pools 140A are shown in the example of FIG. 1A, the embodiments described herein are not limited as such, and one skilled in the art will appreciate that the on-demand code execution system 110 may comprise any number of warming pools and active pools.

In accordance with embodiments of the present disclosure, the on-demand code execution system 110 may operate to dynamically determine content to be rendered in communications. In one embodiment, the on-demand code execution system 110 may enable the determination of various conditions that relate to the communication. In other embodiments, the on-demand code execution system 110 may enable the incorporation of various information related to the specific users into content provided by the on-demand code execution system 110. Illustratively, the on-demand code execution system 110 may enable a content provider to provide executable code in communications that are subsequently provided to the on-demand code execution system 110 that specifies processing to be completed against an input data file (e.g., dynamic content generation), an amount of data to be processed within an individual task execution, state information to be passed from a present task execution to a subsequent task execution, and a function to utilize state information from a past execution to initialize a current task execution. Thereafter, the on-demand code execution system 110 may response to a request to execute the code against While some functionalities are generally described herein with reference to an individual component of the on-demand code execution system 110, other components, or a combination of components may additionally or alternatively implement such functionalities. For example, while a worker manager 140 may operate to record the state of executions for a given execution identifier, a frontend 140 or virtual machine instance may additionally or alternatively record such state information.

Figure 1B:
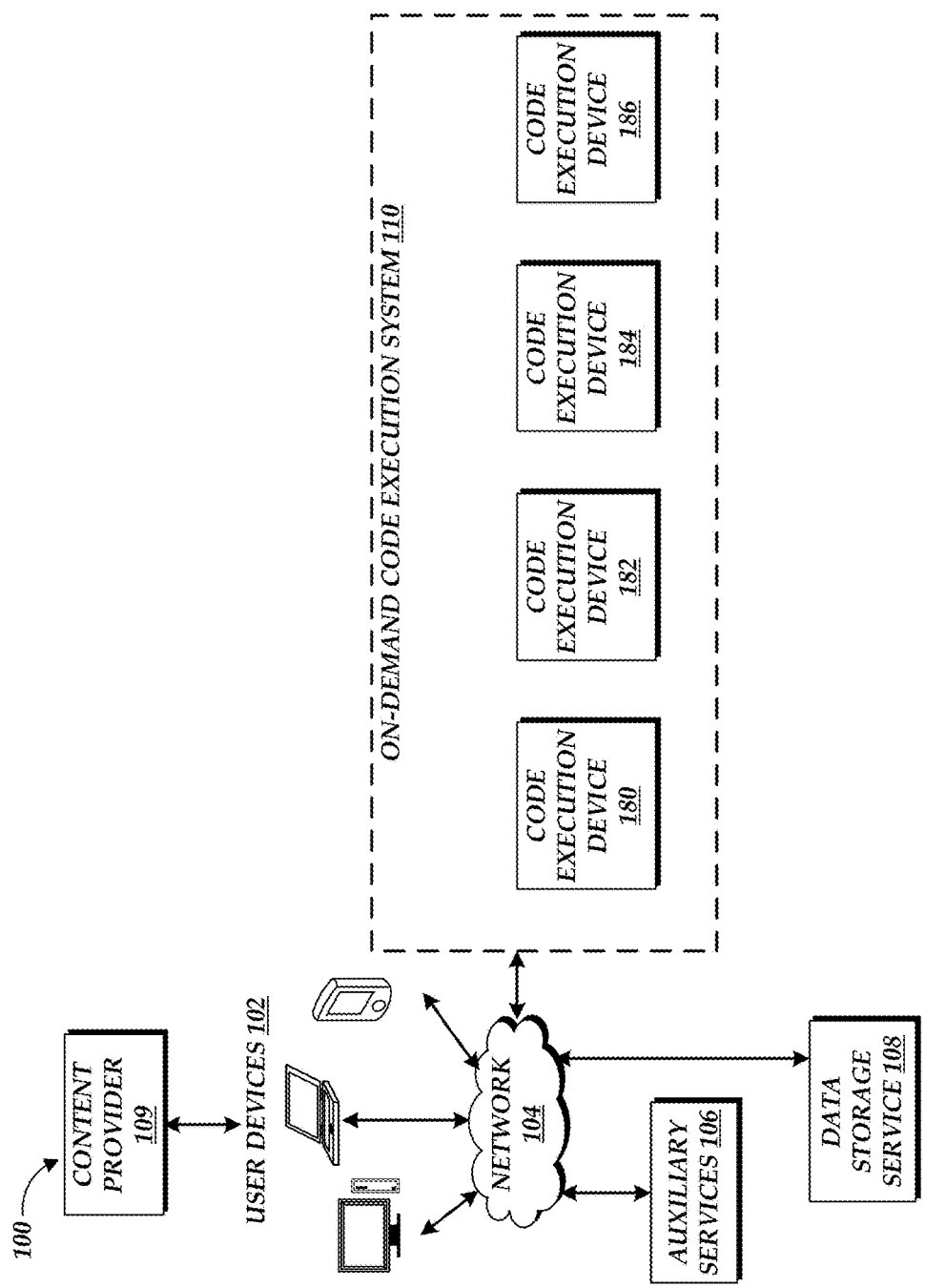
FIG. 1B is a block diagram depicting an alternative illustrative environment in which an on-demand code execution system can operate to execute code, which may be submitted by users of the on-demand code execution system, and to enable execution of such code.

FIG. 1B is a block diagram of another embodiment of an illustrative operating environment 100 in which an on-demand code execution system 110 may operate based on communication with user computing devices 102, auxiliary services 106, network-based data storage services 108, and content providers 109.

In accordance with embodiments, the on-demand code execution system 110 includes a set of hosting environments, illustrated in FIG. 1B as code execution devices 180, 182, 184, and 186. As described in further detail below, the code execution devices 180, 182, 184, and 186 can host one or more services or applications for receiving and executing on-demand code, or data processing code, submitted by user devices 102. As will be discussed below, for purposes of illustration, some of the code execution devices 180, 182, 184, and 186 may correspond to virtual machine instances that operate one or more applications on behalf of a customer. Examples can include, but are not limited to, virtual implementations that can include an operating environment, software application, storage and access to additional services provided by the service provider. In other embodiment, the code execution devices 180, 182, 184, and 186 can also include physical computing devices that are configured in a manner to execute on-demand code submitted by user devices 102.

Figure 2:
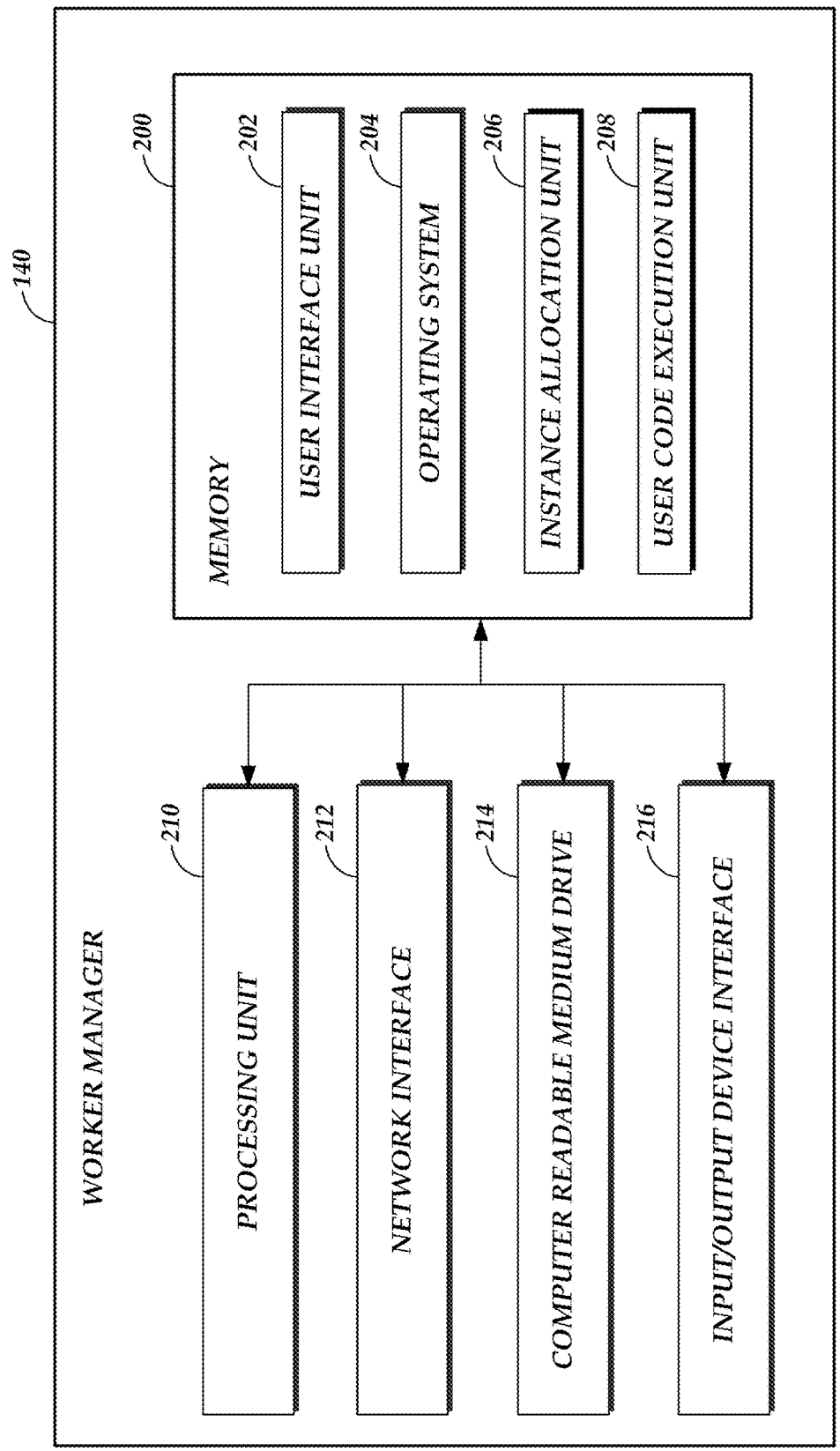
FIG. 2 depicts a general architecture of a computing device providing a worker manager that is configured to facilitate serializing execution of code across multiple, duration-limited task executions on the on-demand code execution system of FIG. 1.

FIG. 2 depicts a general architecture of a computing system (referenced as worker manager 140) that manages the virtual machine instances in the on-demand code execution system 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The worker manager 140 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1A.

As illustrated, the worker manager 140 includes a processing unit 210, a network interface 212, a computer readable medium drive 214, and an input/output device interface 216, all of which may communicate with one another by way of a communication bus. The network interface 212 may provide connectivity to one or more networks or computing systems. The processing unit 210 may thus receive information and instructions from other computing systems or services via the network 104. The processing unit 210 may also communicate to and from memory 200 and further provide output information for an optional display (not shown) via the input/output device interface 216. The input/output device interface 210 may also accept input from an optional input device (not shown).

The memory 200 may contain computer program instructions (grouped as modules in some embodiments) that the processing unit 210 executes in order to implement one or more aspects of the present disclosure. The memory 200 generally includes random access memory (RAM), read only memory (ROM) or other persistent, auxiliary, or non-transitory computer readable media. The memory 200 may store an operating system 204 that provides computer program instructions for use by the processing unit 210 in the general administration and operation of the worker manager 140. The memory 200 may further include computer program instructions and other information for implementing aspects of the present disclosure. For example, in one embodiment, the memory 200 includes a user interface unit 202 that generates user interfaces (or instructions therefor) for display upon a computing device, e.g., via a navigation or browsing interface such as a browser or application installed on the computing device. In addition, the memory 200 may include or communicate with one or more data repositories (not shown), for example, to access user program codes or libraries.

In addition to or in combination with the user interface unit 202, the memory 200 may include an instance allocation unit 206 and a user code execution unit 208 that may be executed by the processing unit 210. In one embodiment, the user interface unit 202, instance allocation unit 206, and user code execution unit 208 individually or collectively implement various aspects of the present disclosure, e.g., finding compute capacity (e.g., a container) to be used for executing user code, causing the user code to be loaded and executed on the container, etc. as described further below.

The instance allocation unit 206 finds the compute capacity to be used for servicing a request to execute user code. For example, the instance allocation unit 208 identifies a virtual machine instance or a container that satisfies any constraints specified by the request and assigns the identified virtual machine instance or container to the user or the request itself. The instance allocation unit 208 may perform such identification based on the programming language in which the user code is written. For example, if the user code is written in Python, and the instance allocation unit 186 may find an virtual machine instance (e.g., in the warming pool 130A of FIG. 1A) having the Python runtime pre-loaded thereon and assign the virtual machine instance to the user. In another example, if the program code specified in the request of the user is already loaded on an existing container or on another virtual machine instance assigned to the user (e.g., in the active pool 140A of FIG. 1A), the instance allocation unit 206 may cause the request to be processed in the container or in a new container on the virtual machine instance. In some embodiments, if the virtual machine instance has multiple language runtimes loaded thereon, the instance allocation unit 206 may create a new container on the virtual machine instance and load the appropriate language runtime on the container based on the computing constraints specified in the request.

The user code execution unit 208 manages the execution of the program code specified by the request of the user once a particular virtual machine instance has been assigned to the user associated with the request and a container on the particular virtual machine instance has been assigned to the request. If the code is pre-loaded in a container on the virtual machine instance assigned to the user, the code is simply executed in the container. If the code is available via a network storage (e.g., storage service 108 of FIG. 1A), the user code execution unit 208 downloads the code into a container on the virtual machine instance and causes the code to be executed (e.g., by communicating with the frontend 120 of FIG. 1A) once it has been downloaded.

While the instance allocation unit 206 and the user code execution unit 208 are shown in FIG. 2 as part of the worker manager 140, in other embodiments, all or a portion of the instance allocation unit 206 and the user code execution unit 208 may be implemented by other components of the on-demand code execution system 110 or another computing device. For example, in certain embodiments of the present disclosure, another computing device in communication with the on-demand code execution system 110 may include several modules or components that operate similarly to the modules and components illustrated as part of the worker manager 140.

In some embodiments, the worker manager 140 may further include components other than those illustrated in FIG. 2. For example, the memory 200 may further include a container manager for managing creation, preparation, and configuration of containers within virtual machine instances.

Figure 3A:
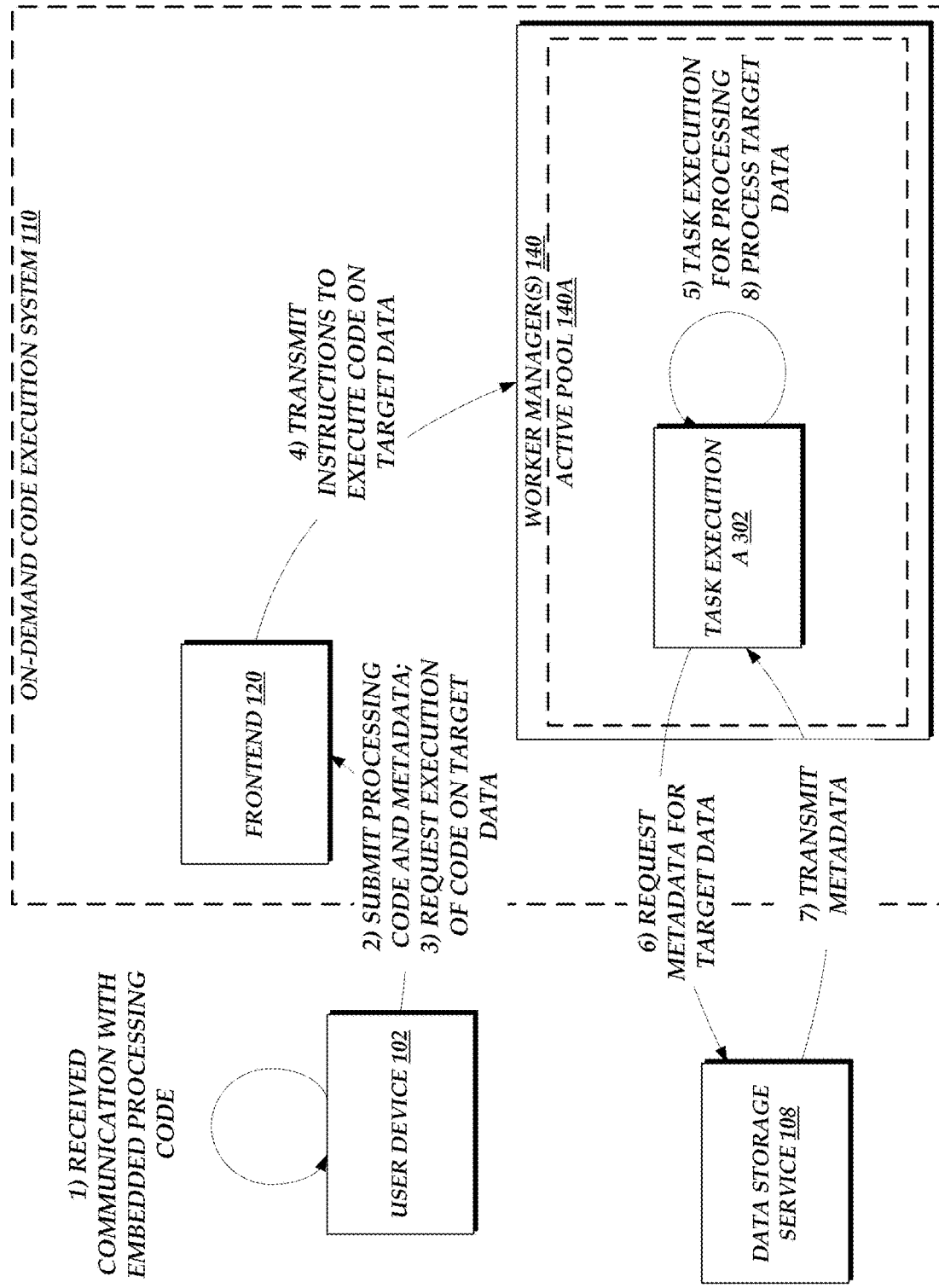
FIGS. 3A and 3B are block diagrams of FIG. 1A depicting illustrative interactions for execution of code for processing a set of data on an on-demand code execution system.
Figure 3B:
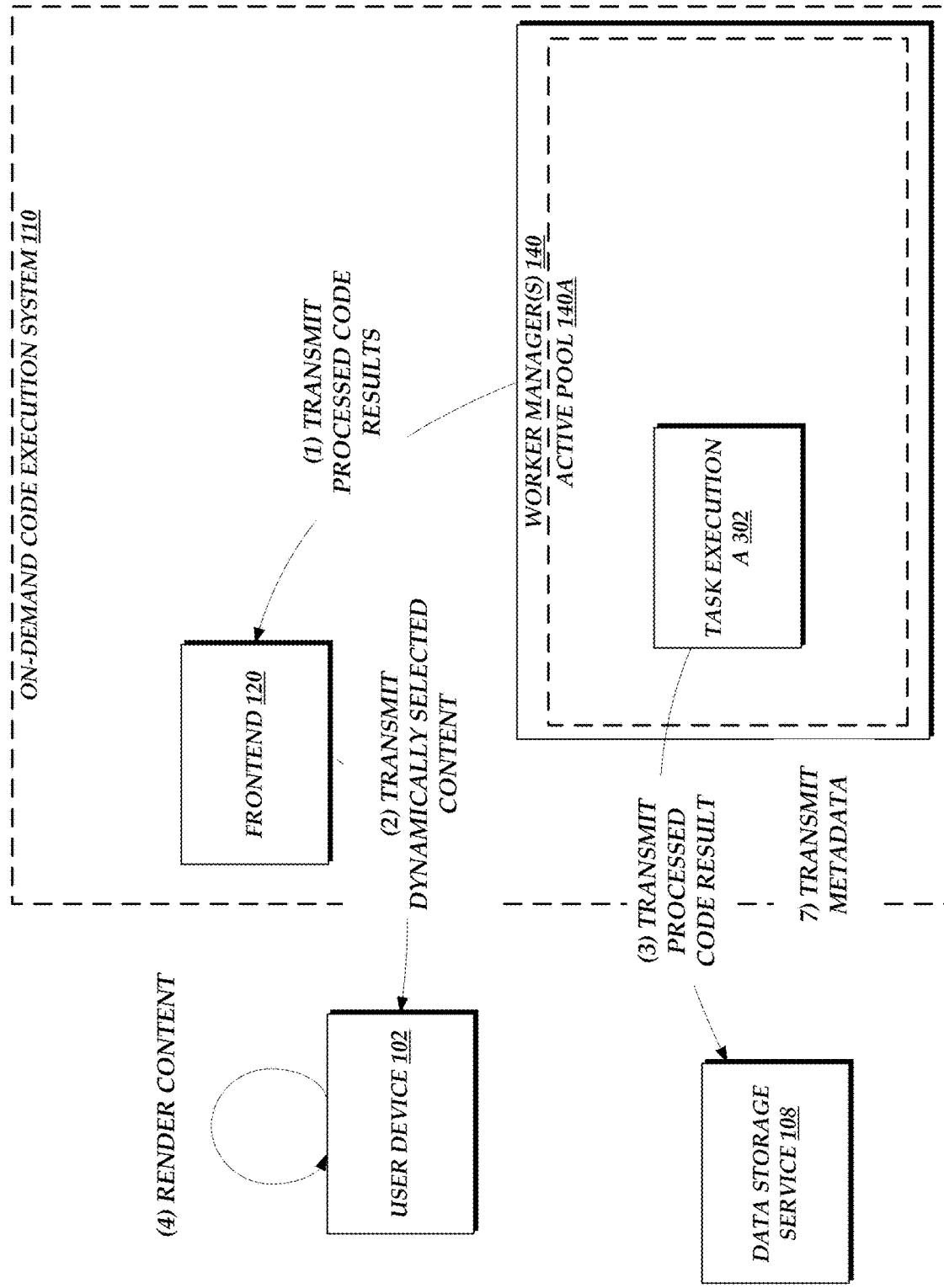
Figure 3C:
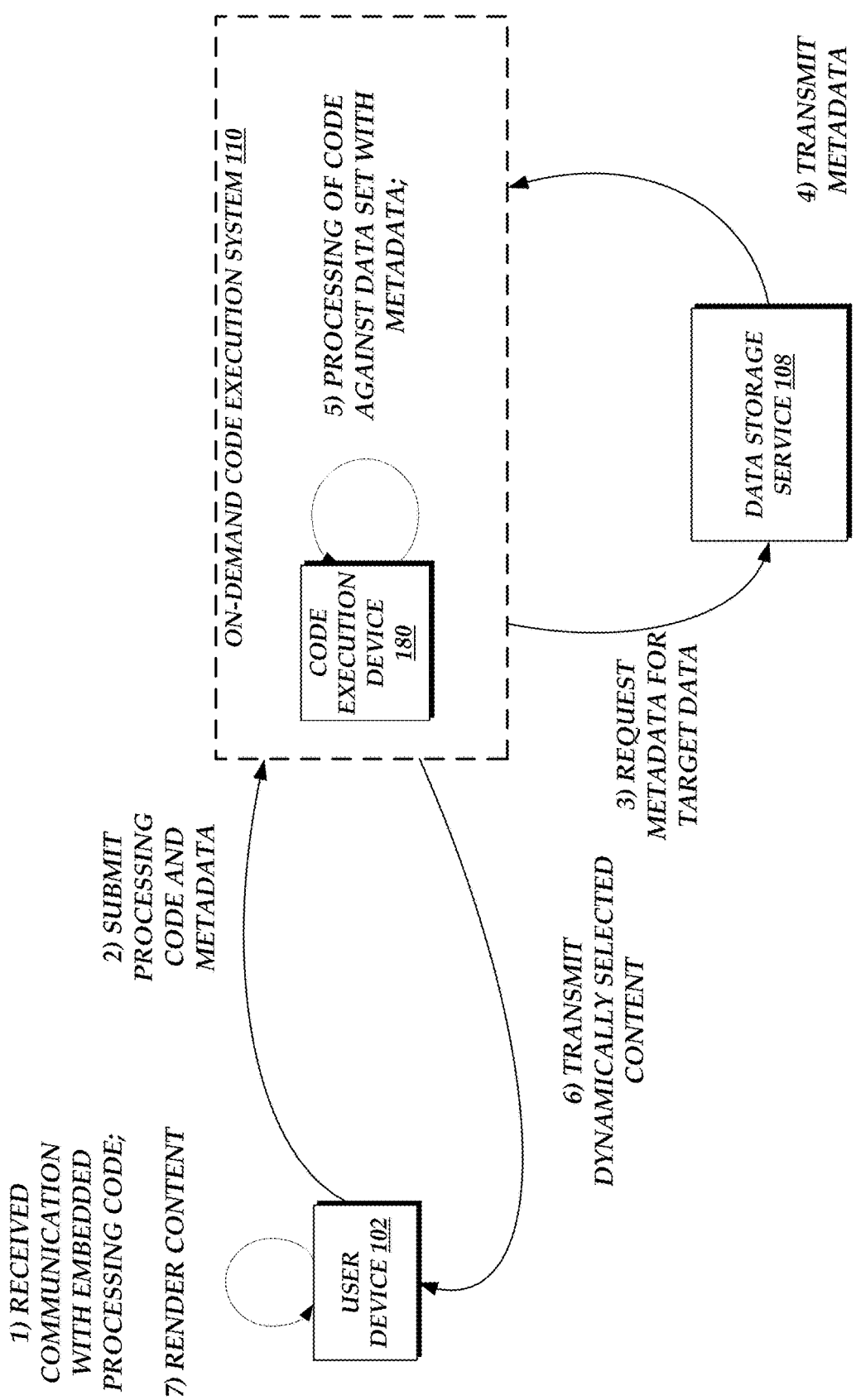
FIG. 3C is a block diagram of FIG. 1B depicting illustrative interactions for execution of code for processing a set of data on an on-demand code execution system.

With reference to FIGS. 3A-3C, illustrative interactions are depicted for processing of task executions or executable code in general embedded in communication by the on the on-demand code execution system 110. Specifically, FIG. 3A depicts interactions enabling a user device 102 to submit content provider-defined data processing code to the on-demand code execution system 110 to generate a task for processing a data set, and to request that the on-demand code execution system 110 begin execution of that task with respect to a target data set (e.g., a target file). FIG. 3B depicts interactions of the on-demand code execution system 110 in providing the results to the user device 102. FIG. 3C depicts different embodiments of interactions of the user device to submit content provider provided data processing code to the on-demand code execution system 110.

With reference to FIG. 3A, the interactions referenced above begin at (1), after a user device obtains data processing code. Illustratively, the user device accesses the data processing code that has been embedded, at least in part, by a content provider (or on behalf of a content provider). In this regard, the content provider may directly generate the data processing code, or have the data processing code generated, such as via the on-demand code execution system 110 (or related service). Accordingly, in one embodiment, the data processing code is generated wholly by a content provider 109. In another embodiment, the data processing code is generated by a content provider 109 based on a template or portion of code provided by the on-demand code execution system 110 (e.g., via a library provided by the on-demand code execution system 110). For example, the on-demand code execution system 110 may in one instance provide a processing function within a library file.

Thereafter, at (2), the user device 102 submits the data processing code to the frontend 120 as a task on the on-demand code execution system 110. Illustratively, the transmission of the data processing code can correspond to an access of the communication by a user on the user device 102. In other embodiments, the transmission of the data processing code can automatically occur with receipt of the communication and pre-access processing by a software application on the user device 102. For example, a software application may be parse received communications, extract at least a portion of the data processing code and transmit the data processing code to the on-demand code execution system 110.

Concurrently or at a later time, the user device 102 may also, at (3), transmit to the frontend 120 a request for execution of the task with respect to target data. Target data may represent, for example, a file located on data storage service 108, an identifier or location of which may be specified within the request to execute the task. While the request to execute the task is illustratively shown as transmitted by the user device 102, task executions may be triggered according to any number of criteria, such as accessing the communication, receiving a communication, time-based criteria, and the like.

As described above, the execution of the data processing code can correspond to a target data set that will facilitate in the dynamic generation of the content. Illustratively, the target data can include information provided by a content provider 109 related to offers for products or services, such as percentage of offers, time limited offers, quantity offers, and the like. In such embodiments, the execution of the data processing code can cause an evaluation of data in the data set and the selection of content to be provided for rendering on the user device. In one example, the execution of the data processing code can correspond to the evaluation of a time or date information (or expiration data) to select from one or more offers provided by the content provider. In another example, the execution of the data processing code can include the determination of an amount of inventory available for sale. The resulting information can include a specific number of items that remain available, general indicators of inventory levels (e.g., "low inventory remaining"), or an indication that an offer is no longer available due to sold out inventory. In still another example, the execution of the data processing code can include the identification of various geographic criteria or events to determine the content that is generated. In this example, the location of the user and the content provider can be utilized to select from options, such as sports teams, weather conditions, geographic specific terminology, applicable taxes or surcharges, preferred languages, and the like. One skilled in the relevant art will appreciate that additional or alternative actions may also be generated with the execution of data processing code. Additionally, the complexity and nature of the data processing code may be commensurate with the type of processing required on the data set.

The target data can also include information associated with a user, such as progress in a checkout pipeline, purchasing information (e.g., controls), previous access information, social media information, and the like. In such embodiments, the execution of the data processing code can cause an evaluation of user data in the data set and the selection of content to be provided for rendering on the user device. In one example, the execution of the data processing code can correspond to the evaluation of a current status of the user in a sales pipeline and the determination of content reflective of the sales pipeline. If the user has previously interacted with a sales interface (e.g., a Web page), but did not finish the ordering/sale process, the data processing code could return an indicator reflective of the current state and encouraging additional interaction. The additional interaction can include graphic controls that would enable or authorize the completion of the sales process. In another example, the execution of the data processing code can include the determination of whether the user has previously purchased an item or service. In this example, the returned content can include language confirming the previous purchase. Additionally, in other variations, the example can include selecting additional or alternative offers reflective of multiple purchases or suggesting complimentary content. In still another example, the execution of the data processing code can cause the on-demand code execution system 110 to access social media information associated with the user indicative of the communication. In this example, the user may receive additional social media messages or may be presented with additional controls that can be generated via a linked social media account (e.g., post this picture to receive additional discounts). One skilled in the relevant art will appreciate that additional or alternative actions may also be generated with the execution of data processing code. Additionally, as described above, the complexity and nature of the data processing code may be commensurate with the type of processing required on the data set.

At (4), the frontend 120 transmits instructions to the worker manager 140 to execute the data processing code as a task within a device of the active pool 140A. At (5), the worker manager 140 initiates an execution of the code as a task within the active pool 140A. That task execution is shown as task execution A 302 within FIG. 3A.

As noted in the '556 Patent, the frontend 120 may undertake various functionalities prior to transmitting the instructions to the worker manager 140, such as queuing the requested execution, identifying the worker manager 140 to receive the instructions, etc. Similarly, the worker manager 140 may undertake various functionalities prior to or as part of initiating a task execution, such as selecting or generating an execution environment for the task. These functionalities are excluded for brevity, but are discussed in more detail within the '556 Patent, incorporated by reference above.

Thus, one skilled in the art will appreciate that the interactions of FIGS. 3A and 3B have been simplified for ease of description.

At (5), the task execution A 302 begins the task execution for processing the target data. Illustratively, this determination may be based on the format of the instructions to execute the task. In some instances, the task execution A 302 therefore transmits, at (6), a request to the data storage service 108 for metadata regarding the target data. The metadata is returned to the task execution A 302 at (7). From the metadata, the task execution A 302, at (8), the task execution A 302 processes the target data, according to the processing specified within the submitted data processing code.

The interactions of FIG. 3A are continued with reference to FIG. 3B. As shown in FIG. 3B, the task execution A 302, at (1), completes processing of the portion of the target data and forwards the resulting content to the frontend 120. The frontend 120 then, at (2), transmits the resulting dynamically generated content to the requesting user device 102. Additionally, at (3), the task execution A 302 detects that processing of the target data is complete and writes a result of the data processing to the data service 108. At (4), the user device 102 renders the communication with the processed content. As previously described, by utilizing the on-demand code, the present application facilitates the dynamic generation of code based on current data sets, such as the availability of goods and services, the validity of a current offer for goods and services, a number of times a consumer has purchased a good or service, selection of alternative offers, incorporating a current state of a purchase pipeline into the communication (e.g., you have added an item into a shopping cart), and the like.

While illustrative interactions are depicted in FIGS. 3A and 3B, the specific interactions implemented by the on-demand code execution system 110 may vary across embodiments of the present application. Thus, the interactions of FIGS. 3A and 3B are intended to be illustrative in nature.

With reference now to FIG. 3C, the interactions referenced above begin at (1), after a user device obtains data processing code. Similar to the process described with regard to FIG. 3A, the user device 102 accesses the data processing code that has been embedded, at least in part, by a content provider (or on behalf of a content provider). In this regard, the content provider may directly generate the data processing code, or have the data processing code generated, such as via a template. Accordingly, in one embodiment, the data processing code is generated wholly by a content provider 109. In another embodiment, the data processing code is generated by a content provider 109 based on a template or portion of code provided by the on-demand code execution system 110 (e.g., via a library provided by the on-demand code execution system 110). For example, the on-demand code execution system 110 may in one instance provide executable script code that is included in a communication for transmission to the on-demand code execution system 110.

Thereafter, at (2), the user device 102 submits the data processing code to the on-demand code execution system 110. In the embodiment illustrated in FIG. 3C, the data processing code does not correspond with a task that requires the utilization of the on-demand code execution system 110 illustrated in FIG. 1A. Rather the on-demand code, or data processing code, may be implemented by a code execution device 180. Illustratively, the code execution device 180 may be selected from code execution devices 180, 182, 184, and 186, as illustrated in FIG. 1B. For example, the on-demand code execution system 110 can utilize a variety of criteria in selected a code execution device, such as load balancing, configuration to execute particular types of data processing code, financial information, and the like. As discussed above the transmission of the code at (2) can also include the inclusion of metadata or other state information that may be utilized in the determination of an appropriate data set or utilized to process the data processing code on the data set.

As described above, the execution of the data processing code can correspond to a target data set that will facilitate in the dynamic generation of the content. Illustratively, the target data can include information provided by a content provider 109 related to offers for products or services, such as percentage of offers, time limited offers, quantity offers, and the like. The target data can also include information associated with a user, such as progress in a checkout pipeline, purchasing information (e.g., controls), previous access information, and the like. Examples of the type of processing of the data processing code (or on-demand code) were previously described with regard to FIG. 3A and would generally applicable in this illustrative embodiment as well.

At (4), the frontend 120 transmits instructions to the worker manager 140 to execute the data processing code as a task within a device of the active pool 140A. At (5), the worker manager 140 initiates an execution of the code as a task within the active pool 140A. That task execution is shown as task execution A 302 within FIG. 3A.

Figure 4:
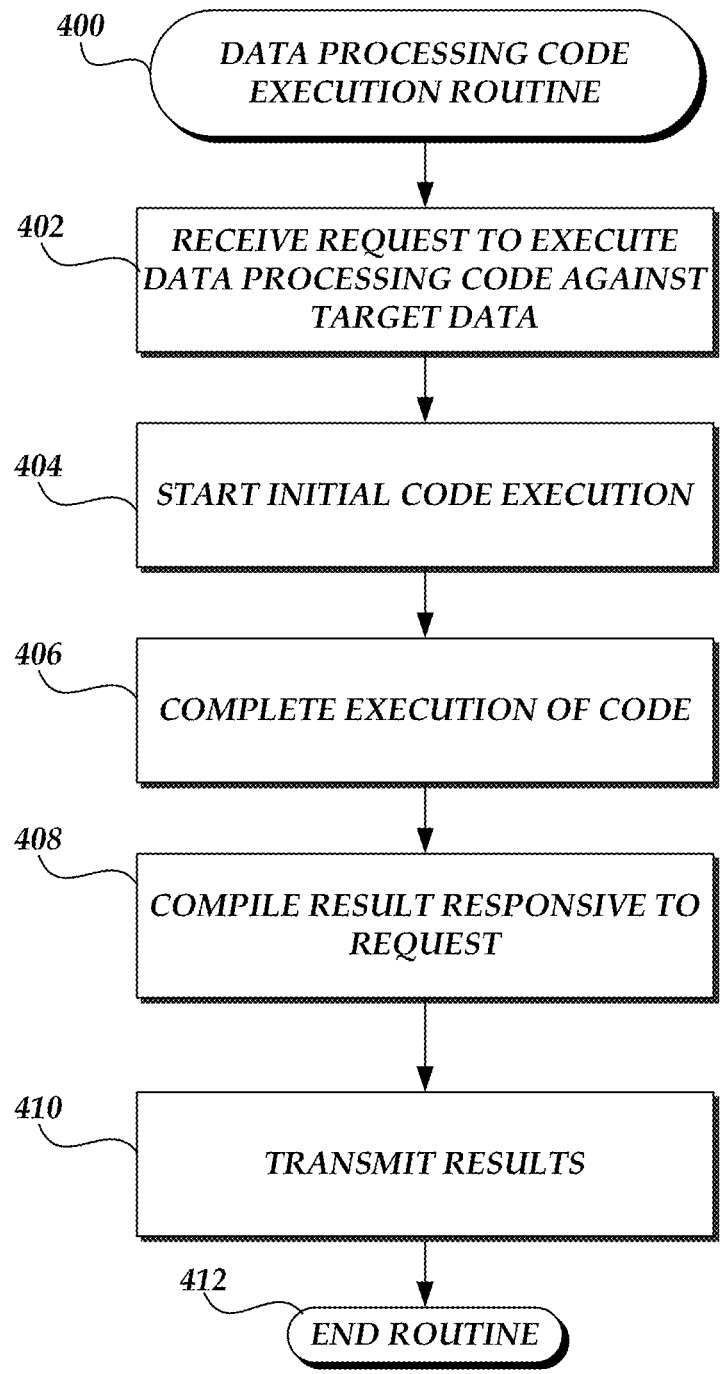
FIG. 4 is a flow chart depicting an illustrative routine for enabling a worker manager within the on-demand code execution system to implement execution of code.

With reference to FIG. 4, an illustrative routine 400 is depicted for execution of data processing code embedded in communications. The routine 400 may be implemented, for example, by the on-demand code execution system 110 of FIG. 1A.

The routine 400 begins at block 402, where the on-demand code execution system 110 receives a call to execute a task corresponding to data processing code against a target data set. As noted above, the data processing code can generally correspond to code that, when executed as a task on the on-demand code execution system 110 (FIG. 1A), causing the on-demand code execution system 110 to process a target data set corresponding to a user request. The data processing code can generally correspond to code that, when executed by a code execution device (180-186) in the on-demand code execution system 110 (FIG. 1B), causes the on-demand code execution system 110 to process a target data set corresponding to a user request. The data processing code may be submitted, for example, by a user device 102 based on libraries or other code supplied by the on-demand code execution system 110 and embedded in or more communications. For example, a user may be presented with multiple forms of communication with the embedded code that facilitates access to the on-demand code execution system 110 via multiple communication channels (e.g., access via email or text).

At block 404, the on-demand code execution system 110 begins execution of the task. Illustratively, a worker manager 140 may locate an execution environment in which to load the code, and then cause the code to be executed within the execution environment. As previously described, by utilizing the on-demand code, the present application facilitates the dynamic generation of code based on current data sets, such as the availability of goods and services, the validity of a current offer for goods and services, a number of times a consumer has purchased a good or service, selection of alternative offers, incorporating a current state of a purchase pipeline into the communication (e.g., you have added an item into a shopping cart), and the like. Accordingly, the execution of the task or tasks can entail processing of the data set to dynamically determine the content to be rendered in the communication. As previously described, the dynamic generation can include a different determination of content each time the on-demand code is selected or transmitted to the on-demand code execution system 110. For example, the evaluation of expiration criteria as part of the data processing code may render different results each time the data processing code is processed.

At block 406, the on-demand code execution system completes processing of the portion of the target data and forwards the resulting content to the frontend 120. At block 408, the frontend 120 compiles the results responsive to the request and transmits the resulting dynamically generated content to the requesting user device 102 at block 410. Additionally, at 410, the task execution A 302 detects that processing of the target data is complete and writes a result of the data processing to the data service 108. At block 412, the routine 400 terminates.

Figure 5:
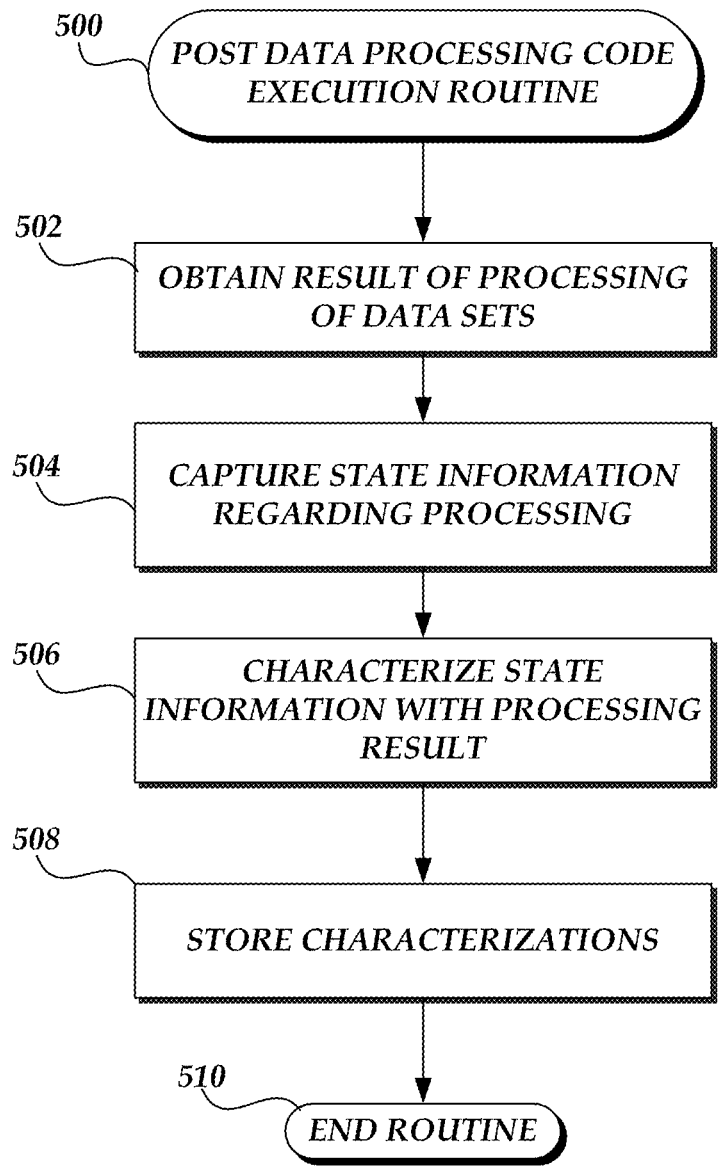
FIG. 5 is a flow chart depicting an illustrative routine for enabling a worker manager within the on-demand code execution system to implement subsequent processing of data code execution results.

With reference now to FIG. 5, an illustrative routine 500 is depicted for additional processing of the execution of data processing code by the on-demand code execution system 110 of FIG. 1A.

The routine 500 begins at block 502, where the on-demand code execution system 110 obtains the results of calls to execute a task corresponding to data processing code against a target data set. As noted above, the data processing code can generally correspond to code that, when executed as a task on the on-demand code execution system 110, causing the on-demand code execution system 110 to process a target data set corresponding to a user request. The data processing code may be submitted, for example, by a user device 102 based on libraries or other code supplied by the on-demand code execution system 110 and embedded in or more communications. For example, a user may be presented with multiple forms of communication with the embedded code that facilitates access to the on-demand code execution system 110 via multiple communication channels (e.g., access via email or text).

At block 504, the on-demand code execution system 110 obtains state information associated with the processing on the on-demand code, such as location, time of day, a count of the number of times a communication has been accessed, customer identifiers, content provider identifiers, information associated with user devices 120 (e.g., operating systems, application, etc.), access time, and the like. At block 506, the on-demand code execution system 110 characterizes the state information with the execution of the on-demand code. In one embodiment, the on-demand code execution system 110 can characterize the execution of a success or not success based on determined subsequent activity. In another embodiment, the on-demand code execution system 110 can characterize state information (such as a click or access time) based on specific images or text. In still other embodiments, the on-demand code execution system 110 can further characterize the state information based on demographic information, such as location, customer characteristics, and the like. At block 506, the on-demand code execution system 110 stores the characterization information. A block 508, the routine 500 terminates. One skilled in the relevant art will appreciate that the on-demand code execution system 110 can subsequently utilize the characterization information to generate a score for potential communications or provide recommendations to content providers 109 based on the characterization data.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Any routine descriptions, elements or blocks in the flow diagrams described herein or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to implement data processing code in an on-demand code execution system, wherein the on-demand code execution system generates one or more execution environments in which to execute tasks corresponding to the data processing code, the system comprising:
    a non-transitory data store storing the data processing code, wherein the data processing code, when executed as a task within an execution environment, causes the on-demand code execution system to conduct data processing against a target data set; and one or more processors in communication with the non-transitory data store and memory storing computer-executable instructions, that when executed cause the one or more processors to:
- receive a request to execute the task from a user computing device, the request transmitted responsive to receipt of a communication by the user computing device and identifying the target data set and applicable metadata, the target data set corresponding to a selection of content to be rendered in a communication,
- wherein the data processing code is embedded in the communication received by the user computing device;
- initiate an execution of the task on the on-demand code execution system, wherein the execution of the task is associated with data set accessible by the on-demand code execution system and results in dynamic selection of content to be rendered by the user computing device;
- compile the dynamically selected content; and
- transmit the dynamically selected content to be included in the communication,
- wherein the dynamically selected content is rendered by the user computing device to present the dynamically selected content in the communication.

2. The system of claim 1, wherein the communication includes an email, text message, chat, or multi-media message.

3. The system of claim 1, wherein the data set includes information associated with an offer by a content provider and wherein execution of the task corresponds to evaluation of the offer at the time of execution of the task.

4. The system of claim 1, wherein the data set includes information associated with an identified user and wherein execution of the task corresponds to evaluation of information associated with the identified user at the time of the execution of the task.

5. A computer-implemented method comprising:
- obtaining, from a user computing device, data processing code executable by an on-demand code execution system, wherein the on-demand code execution system includes one or more processors and memory storing computer-executable instructions, wherein the data processing code is embedded in one or more communications received by the user computing device, and wherein an execution of the data processing code causes the one or more processors to execute the computer-executable instructions to cause the on-demand code execution system to:
- conduct data processing against a portion of a data set;
- dynamically determine content to be included in the one or more communications to the user computing device;
- compile the dynamically determined content; and
- transmit the one or more communications including the determined content to the user computing device, the determined content to be rendered by the user computing device.

6. The computer-implemented method of claim 5, wherein the data set includes information included in a transmittal of the data processing code by the user computing device and wherein execution of the data processing code corresponds to incorporation of the information included in the transmittal of the data processing code.

7. The computer-implemented method of claim 5, wherein the data set includes information associated with an offer by a content provider and wherein execution of the data processing code corresponds to evaluation of the offer at the time of execution of the task.

8. The computer-implemented method of claim 7, wherein evaluation of the offer includes evaluation of expiration information associated with the offer.

9. The computer-implemented method of claim 7, wherein evaluation of the offer includes evaluation of availability information associated with the offer.

10. The computer-implemented method of claim 7, wherein evaluation of the offer includes evaluation of regional restriction information associated with the offer.

11. The computer-implemented method of claim 5, wherein the data set includes information associated with two or more offers by a content provider and wherein execution of the data processing code corresponds to selection of one of the two or more offers at the time of execution of the task.

12. The computer-implemented method of claim 5, wherein the data set includes information associated with a user and wherein execution of the data processing code corresponds to evaluation of information associated with the user at the time of the execution of the data processing code.

13. The computer-implemented method of claim 12, wherein evaluation of the information associated with the user includes determination of a state of a purchase pipeline.

14. The computer-implemented method of claim 12, wherein evaluation of the information associated with the user includes determination of a purchase history.

15. Non-transitory computer readable media comprising:
- data processing code executable in accordance with an on-demand code execution system,
- wherein the data processing code is embedded in one or more communications transmitted to a user computing device, and wherein an individual request for execution of the data processing code is responsive to the user computing device receiving the communication and transmitting data processing code to the on-demand code execution system that causes the on-demand code execution system to:
- dynamically determine content to be included in the one or more communications to the user communication device based on execution of the data processing code against a data set and applicable metadata;
- compile the dynamically determined content; and
- transmit the one or more communications including the determined content to the user computing device, the determined content to be rendered by the user computing device.

16. The non-transitory computer-readable media of claim 15, wherein the data set includes information associated with an offer by a content provider and wherein execution of the data processing code corresponds to evaluation of the offer at the time of execution of the task.

17. The non-transitory computer-readable media of claim 15, wherein the data set includes information associated with two or more offers by a content provider and wherein execution of the data processing code corresponds to selection of one of the two or more offers at the time of execution of the task.

18. The non-transitory computer-readable media of claim 15, wherein the data set includes information associated with social media accounts and wherein execution of the data processing code causes access to social media accounts.

19. The non-transitory computer-readable media of claim 15, wherein the data set includes information associated with previous execution of the data processing code and wherein execution of the data processing code corresponds to incorporation of a result of a previous execution.

20. The non-transitory computer-readable media of claim 15, wherein the data set includes state information associated with transmittal of the data processing code and wherein execution of the data processing code corresponds to incorporation of the state information.

\* \* \* \* \*